United States Patent [19]

Klaus

[11] Patent Number: 4,869,654
[45] Date of Patent: Sep. 26, 1989

[54] MAGNETIC PUMP DRIVE

[75] Inventor: Franz Klaus, Bochum, Fed. Rep. of Germany

[73] Assignee: Franz Klaus Union Armaturen Pumpen GmbH & Co., Fed. Rep. of Germany

[21] Appl. No.: 189,703

[22] Filed: May 3, 1988

[30] Foreign Application Priority Data

May 9, 1987 [DE] Fed. Rep. of Germany ....... 3715484

[51] Int. Cl.$^4$ .......................... F04B 39/00; F04B 17/00
[52] U.S. Cl. .................................... 417/360; 417/420; 417/423.14; 464/29
[58] Field of Search ................... 417/360, 420, 423.14, 417/423.15; 464/29

[56] References Cited

U.S. PATENT DOCUMENTS

| 3,802,804 | 4/1974 | Zimmermann | 417/420 X |
| 4,047,847 | 9/1977 | Oikawa | 417/370 |
| 4,127,365 | 11/1978 | Martin et al. | 417/420 |

FOREIGN PATENT DOCUMENTS

| 3612802 | 10/1987 | Fed. Rep. of Germany . | |
| 57-020867 | 5/1982 | Japan | 417/420 |
| 61-014495 | 1/1986 | Japan | 417/420 |

Primary Examiner—Carlton R. Croyle
Assistant Examiner—Eugene L. Szczecina, Jr.
Attorney, Agent, or Firm—Banner, Birch, McKie & Beckett

[57] ABSTRACT

A magnetic pump drive comprises an isolating shell which is structured in the form of a stepped cylinder having at least one step for creating at least two cylindrical sections of different diameters. The efficiency of the power transmission of a driver carrying permanent magnets through the isolating shell onto a rotor also carrying permanent magnets is maintained in comparison with the efficiency of known devices, but the strength and form stability of the isolating shell is drastically improved. The strength against high system pressures is based on the steps which may comprise slipped-over rings or comprise integral reinforcement rings which act like barrel hoops.

6 Claims, 1 Drawing Sheet

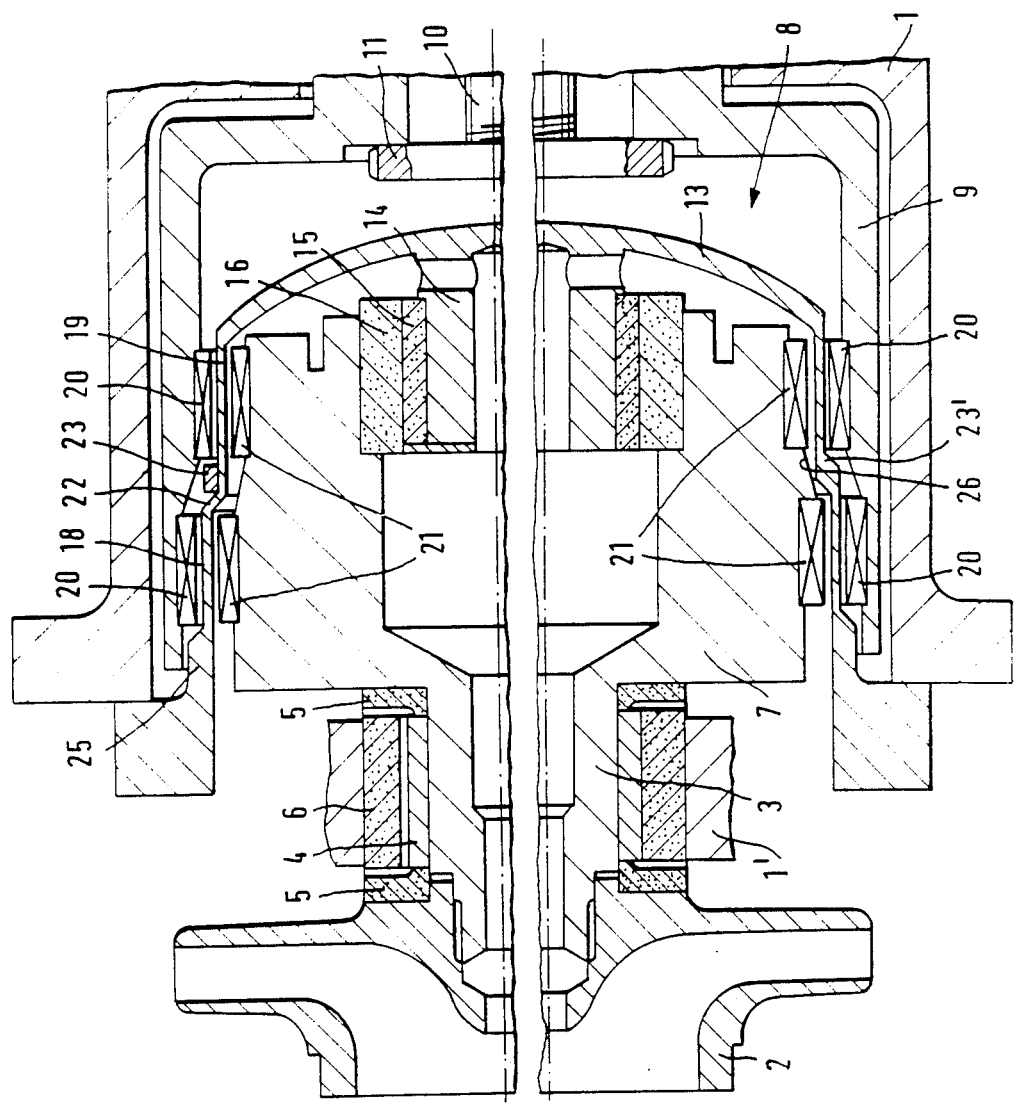

MAGNETIC PUMP DRIVE

BACKGROUND OF THE INVENTION

1. Field of the Invention

The present invention relates to the field of magnetic pump drives and, more particularly, to a magnetic pump drive comprising an isolating shell. In particular the magnetic pump drive comprises a driver/ driven by a motor, a rotor encircled by the driver and connected with an impeller of the pump, at least two circles of permanent magnets, one of the two circles being attached to a cylindrical face of the rotor and respectively the driver in opposite relation, and a stationary isolation shell. The stationary isolation shell, which encircles the rotor, is filled by the medium to be pumped and is sealed against the housing of the pump. The force of the permanent magnets passes through the isolating shell for effecting the drive from the driver to the rotor.

2. Description of the Prior Art

Magnetic pump drives have been known in the art for many years. The known drives have proven to be reliable in the chemical industry and in nuclear power stations. Because there is no shaft duct and there is no leakage along a shaft out of the sealing, these pumps have only gaskets, which are more easily handled and which are much less prone to a leak than a seal against a rotating shaft.

When a pump of this kind is submitted to high system pressures, the isolating shell has the tendency to bulge, i.e. to take the form of a barrel. This tendency is even greater when a rather strong drive is necessary so that several circles of single permanent magnets are used, one after the other, in order to transmit the required torque in the drive section. In this case the free length between the sealing flange of the isolating shell and its bottom is rather large so that the biggest increases in diameter due to high system pressures occur in the middle section of the isolation shell.

It has been tried to prevent corresponding deformations of pumps made completely from plastic material by winding fibres onto the isolating shell which consists also of a plastic material. The fibres are formed onto the isolating shell in a slightly pre-biased condition in order to allow a certain deformation under load.

The aim of these intentions is to arrange the permanent magnets of the driver and rotor at a distance from one another as small as possible for achieving a good efficiency of the permanent magnetic clutch. Thus a rather small thickness of the isolating shell at least in the cylindrical section and a small deformation due to pressure loads are practically achieved so that losses in efficiency are not too great when, for safety reasons, a greater distance between opposing magnets is chosen than necessary as a matter of design choice.

When metallic isolating shells are used, the gains, as to form stability by fibres wound onto the cylindrical sections, are small, since nearly the same effect is achieved by a direct thickening of the isolating shell wall. The drop in efficiency is accepted.

In co-pending German patent application P36 12 802.3 filed Apr. 16, 1986 and published Oct. 22, 1987, the present applicant has proposed to support the cylindrical section of the isolating shell by rings between which the circles of permanent magnets are arranged. Thus the form stability of the isolating shell is enhanced; however, the assembly is rather complicated. It is necessary to use a driver made from two halves or to take corresponding measures.

SUMMARY OF THE INVENTION

It is therefore an object of this invention to improve the magnetic drive of the aforementioned kind so that an improved form stability even under high pressure loads of the isolating shell is achieved while maintaining favourable conditions for the assembly and a good efficiency.

In order to meet this object the present invention comprises an isolating shell the cylindrical section of which is provided with at least one step between at least two cylindrical sections of different diameters, the section with the smaller diameter being positioned nearest to the bottom of the isolating shell.

The invention proposes to divide the isolating shell into several cylindrical sections which are separated but respectively connected by steps. The diameter of the single cylindrical sections decreases in a direction from the mounting flange to the bottom. The steps practically form reinforcement rings which have the greatest effect when the transition is especially sharp. If big radii are used, any notch effect can be prevented, allowing the full use of the steps as supporting rings, or respectively, reinforcement rings. The cylindrical sections between the steps can be used for arranging the magnets in the usual way so that no additional losses have to be encountered by thicker walls or bigger distances between opposing magnets fixed to the driver and the rotor respectively.

The driver may be slipped over the isolating shell from one side and the rotor can be immersed into the isolating shell from the other side just as is practiced during the common assembly method.

The step sections can be additionally reinforced by a material accumulation, for instance by positioning the diameter transition from one diameter to the other, closer to the isolating shell bottom on the outside than on the inside. In this way, an integral reinforcement ring is created which causes the wall thickness to increase at this portion of the isolating shell and which contributes considerably to an improved form stability. Instead of an integral reinforcement ring, a separate outer ring may be placed onto the isolating shell the outer diameter of which corresponds to the adjacent diameter of the larger cylindrical section or which is slightly larger than the adjacent cylindrical section.

Independently from the shape of the steps, they cause rather short free cylindrical sections so that high system pressures within the isolating shell are well controlled and do not cause considerable deformations for instance in the shape of a barrel. The free sections can be chosen very short so that a rather rigid isolating shell is created which is combined with narrow circles of permanent magnets. Economical permanent magnets can be used at a length of 1 cm in the axial direction of the isolating shell and less.

Integral reinforcement rings or a material accumulation in the area of the free edge of the driver serve for the driver as well as for the rotor as a "sacrificial friction surface" which contacts the driver or the rotor in the case of bearing damages before the permanent magnets or other sections scrub against much more sensitive sections of the isolating shell. This property improves the safety against a damage of the isolating shell and thus against an unintended flow-out of the fluid to be pumped out of the isolating shell. By installing corresponding sensors, a contact between the rotor and isolating shell or respectively the driver and the isolating shell can be detected and an alarm may be initiated. In this way the improved safety is also controllable.

Not necessarily each cylindrical section between two steps or respectively between a step and the bottom or the frontal sealing flange must be used for transmitting magnet forces, but other equipment can be used, for instance an auxiliary impeller for circulating the fluid to be pumped through the coupling section. It is only important that the isolating shell has a sufficient rigidity against deformations being partly thin-walled.

BRIEF DESCRIPTION OF THE DRAWING

An embodiment of the invention which is shown in the drawing will be explained hereinafter in greater detail. The only figure of the drawing shows a cross-sectional view through a magnetic pump drive according to the invention and more particularly shows in the upper half a step with a reinforcement ring being slipped onto the isolating shell and in the lower half a step with an integral reinforcement ring.

DETAILED DESCRIPTION

The shown embodiment has a coupling housing 1 to which a pump housing 1' is attached by bolts. The pump housing 1' is only partly shown. Within the pump housing 1' an impeller 2 rotates which is connected to a rotor 7 with the aid of a shaft 3. The shaft 3 and rotor 7 are an integral component. The shaft 3 is supported with the aid of a bearing bushing 4 within a radial bearing 6 the sides of which are kept in position by lateral axial bearing washers 5. The rotor 7 is again supported at the free end by hub 14 on a bottom 13 of an isolating shell 8, namely with the aid of a stationary bearing bushing 15 around which a radial bearing 16 rotates.

Within the coupling housing 1, a driver 9 is rotatably supported. The driver 9 is screwed to an only partially shown shaft 10 with the aid of crown nut 11, the shaft 10 being rotationally supported by ballbearing races (not shown). The driver has a bell shape. Within the cavity of the driver is placed the isolating shell 8 which also like a bell encloses the rotor 7. On the outside of the rotor 7 as well as on the inside of the driver 9 pairs of permanent magnets 20 and 21 are mounted the polarity of which changes in reference either to the driver 9 or to the rotor 7. Opposed are a south pole of the driver 9 and a north pole of the rotor 7 situated immediately adjacent a north pole of the driver 9 and a south pole of the rotor 7 such that each oppose one another. This is continued for both circles of permanent magnets 20 and 21. By these permanent magnets 20 and 21 the driving force of an electric motor (not shown) is transferred from the driver 9 onto the rotor 7 and thus onto the impeller 2.

The isolating shell 8 is differently designed from known isolating shells. In the area of circles of permanent magnets 20 and 21 the isolating shell 8 has cylindrical sections 18 and 19 respectively which are connected by a step 22. In the upper half of the figure of the drawing an embodiment is shown which has substantially a continuous wall-thickness across the step 22. For an additional support at this place, a reinforcement ring 23 is slipped onto the cylinder section 19 having a smaller diameter which surrounds and supports the isolating shell like a barrel hoop. The outer diameter of the reinforcement ring 23 is so chosen that it corresponds substantially to the diameter of the adjacent cylindrical section having the bigger diameter. In this way the circle of permanent magnets 20 facing the impeller 2 can be slipped over the reinforcement ring 23 during the assembly without any problem.

On the lower half of the figure, at the corresponding place, an integral reinforcement ring 23' is shown which can be discerned as a material accumulation within the isolation shell material. It has substantially the same effect as the embodiment previously described; there are only differences during the manufacture. It can be clearly seen that on both sides of the step 22 usual conditions prevail as to the geometry of an isolating shell, i.e. the permanent magnets 20 and 21 are rotating relatively closely along the thin-walled isolating shell on each side.

In the area of the free edge of the driver 9 the isolating shell carries according to a development of the invention a material accumulation 25 which surrounds the isolating shell 8 like a ring. At this place the distance between the surface of the cylindrical section 18 to the inside of the driver 9 is smaller than the distance to the permanent magnets 20 so that, when the bearings of the shaft 10 are damaged, the permanent magnets 20 do not touch the thin-walled cylindrical section 18 of the isolating shell 8, but the free edge of the driver 9 touches the material accumulation 25. In this way, at first, the danger of a serious damage of the isolating shell 8 is significantly reduced. A corresponding safety equipment can be arranged on the inside of the isolating shell 8 which is indicated by a slope 26 in the lower half of the figure in the very vicinity to the integral reinforcement 23'. The slope 26 touches the isolating shell at this place when the bearings of the rotor 7 are damaged before the permanent magnets 21 have the opportunity to touch the inside of the isolating shell 8.

The choice between an integral reinforcement ring 23' and a reinforcement ring 23 put onto the isolating shell depends on the kind of use. If for corrosion prevention reasons relatively soft materials have to be used for the isolating shell 8, the installation of slipped-over reinforcement rings 23 is recommended which can be chosen from a much stronger material having a higher modulus of elasticity. Otherwise by choosing the extension in the axial direction and over and above by adjusting the height of the step 22, nearly any intended strength can be achieved.

Of course, more circles of permanent magnets can be used than are shown in the figure of the drawing if the drive is designed correspondingly. Also an auxiliary impeller can be mounted within one of the cylindrical section of the isolating shell 8 or like components. This is an indication that form stability of the isolating shell 8 is the important aspect and not the maximum number of permanent magnets.

In the only figure of the drawing two embodiments are demonstrated which, of course, are never executed in one and the same device. Either a separate reinforcing ring or an integral reinforcing ring is used for supporting one step. If necessary adjacent steps can be reinforced either way, but normally the reinforcement of the whole shell in the area of the steps is of the same type.

I claim:

1. A magnetic pump drive comprising a driver driven by a motor, a rotor encircled by the driver and connected with an impeller of the pump, the driver and rotor having an identical number of permanent magnets on opposite cylindrical faces, of which two opposing magnets form a pulling pair, a stationary isolation shell having a bottom, which encircles the rotor, the stationary isolation shell being in contact with the medium to be pumped on its inside and sealed against the housing of the pump, and through which shell the force of the permanent magnets passes for effecting the drive from the driver to the rotor, the isolating shell having at least two cylindrical sections connected by a step and of different diameter, the cylindrical section with the smaller diameter being nearest to the bottom of the isolating shell, wherein a reinforcing ring is slipped onto the cylindrical section having the smaller diameter of the isolating shell, the outer diameter of which ring corresponds to or is slightly larger than the adjacent cylindrical section having the larger diameter.

2. Magnetic pump drive according to claim 1 wherein the distance of the permanent magnets of the driver from the surface of the isolating shell in the corresponding cylindrical section is larger than the distance of the driver to one of the reinforcement rings.

3. A magnetic pump drive comprising a driver driven by a motor, a rotor encircled by the driver and connected with an impeller of the pump, the driver and rotor having an identical number of permanent magnets on opposite cylindrical faces, of which two opposing magnets from a pulling pair, a stationary isolation shell having a bottom, which encircles the rotor, the stationary isolation shell being in contact with the medium to be pumped on its inside and sealed against the housing of the pump, and through which shell the force of the permanent magnets passes for effecting the drive from the driver to the rotor, the isolating shell having at least two cylindrical sections connected by a step and of different diameter, the cylindrical section with the smaller diameter being nearest to the bottom of the isolating shell, wherein the diameter transition of the isolating shell in the area of the step is closer to the bottom of the isolating shell on the outside than on the inside for creating an integral reinforcing ring, wherein the distance of the permanent magnets of the driver from the surface of the isolating shell in the corresponding cylindrical section is larger than the distance of the driver to one of the reinforcement rings.

4. A magnetic pump drive comprising a driver driven by a motor, a rotor encircled by the driver and connected with an impeller of the pump, the driver and rotor having an identical number of permanent magnets on opposite cylindrical faces, of which two opposing magnets form a pulling pair, a stationary isolation shell having a bottom, which encircles the rotor, the stationary isolation shell being in contact with the medium to be pumped on its inside and sealed against the housing of the pump, and through which shell the force of the permanent magnets passes for effecting the drive from the driver to the rotor, the isolating shell having at least two cylindrical sections connected by a step and of different diameter, the cylindrical section with the smaller diameter being nearest to the bottom of the isolating shell, wherein the isolating shell comprises a material accumulation in the area of the free edge of the driver, the distance of the driver from the surface of the isolating shell being a minimum at the place of the material accumulation.

5. A magnetic pump drive comprising a driver driven by a motor, a rotor encircled by the driver and connected with an impeller of the pump, the driver and rotor having an identical number of permanent magnets on opposite cylindrical faces, of which two opposing magnets form a pulling pair, a stationary isolation shell having a bottom, which encircles the rotor, the stationary isolation shell being in contact with the medium to be pumped on its inside and sealed against the housing of the pump, and through which shell the force of the permanent magnets passes for effecting the drive from the driver to the rotor, the isolating shell having at least two cylindrical sections connected by a step and of different diameter, the cylindrical section with the smaller diameter being nearest to the bottom of the isolating shell, wherein the driver and rotor comprise permanent magnets in the area of each cylindrical section of the isolating shell.

6. Magnetic pump drive according to claim 5 wherein the relative distances of the permanent magnets of the driver and the rotor respectively to each other and to the isolating shell in each cylindrical section are substantially identical.

* * * * *